US00RE46321E

(19) United States
(12) Reissued Patent
Hubert et al.

(10) Patent Number: US RE46,321 E
(45) Date of Reissued Patent: Feb. 28, 2017

(54) MULTI-SEGMENT TOOL AND METHOD FOR COMPOSITE FORMATION

(71) Applicant: Rohr, Inc., Chula Vista, CA (US)

(72) Inventors: Claude Marc Hubert, Riverside, CA (US); Michael Ray Aten, San Diego, CA (US); Michael John Layland, Bonita, CA (US); Lee A. Tichenor, Temecula, CA (US); Ron Long, Mesa, AZ (US)

(73) Assignee: ROHR, INC., Chula Vista, CA (US)

(21) Appl. No.: 14/656,643

(22) Filed: Mar. 12, 2015

Related U.S. Patent Documents

Reissue of:
(64) Patent No.: 8,394,315
Issued: Mar. 12, 2013
Appl. No.: 13/217,709
Filed: Aug. 25, 2011

U.S. Applications:
(62) Division of application No. 12/263,915, filed on Nov. 3, 2008, now Pat. No. 8,025,499.

(51) Int. Cl.
*B29C 70/44* (2006.01)
*B29C 70/54* (2006.01)
(Continued)

(52) U.S. Cl.
CPC ..... *B29C 70/446* (2013.01); *B29C 33/48* (2013.01); *B29C 70/54* (2013.01);
(Continued)

(58) Field of Classification Search
None
See application file for complete search history.

(56) References Cited

U.S. PATENT DOCUMENTS 1,835,986 A 12/1931 Heston
2,586,300 A 2/1952 Campbell
(Continued)

FOREIGN PATENT DOCUMENTS

DE 1262570 3/1968
DE 1262570 B 3/1968
(Continued)

OTHER PUBLICATIONS

Restriction Requirement dated Jan. 5, 2011 in U.S. Appl. No. 12/263,915.
(Continued)

*Primary Examiner* — Ling Xu
(74) *Attorney, Agent, or Firm* — Snell & Wilmer, L.L.P.

(57) ABSTRACT

A multi-segment tool and tooling system for vacuum forming a composite part. A tool can include a first tool having first and second surfaces. A second tool can have an opening positioned on a first tool in a location other than the first surface or the second surface. The first tool and second tool can receive at least a portion of a preform composite. The first tool can have a vacuum barrier attached to the first surface and to the second surface encapsulating the preform composite and the second tool. A tooling system can include a first tool having a core and a base with a core extending upwards from the base. A second tool can be positioned upon the core where the core extends above the second tool. A vacuum barrier sealed to the base and the core can include a composite, the first tool and the second tool.

17 Claims, 20 Drawing Sheets

(51) Int. Cl.
*B29C 33/48* (2006.01)
*B29L 31/30* (2006.01)

(52) U.S. Cl.
CPC ..... *B29L 2031/3076* (2013.01); *Y10S 425/06* (2013.01); *Y10T 29/49895* (2015.01); *Y10T 29/49904* (2015.01)

(56) References Cited

U.S. PATENT DOCUMENTS

| | | | | |
|---|---|---|---|---|
| 3,081,705 | A | | 3/1963 | Wamken |
| 3,633,267 | A | | 1/1972 | Deminet et al. |
| 3,646,185 | A | | 2/1972 | Jennings |
| 3,646,186 | A | | 2/1972 | Jennings |
| 3,768,954 | A | | 10/1973 | Marsh et al. |
| 3,957,416 | A | | 5/1976 | Kaempen |
| 4,122,672 | A | | 10/1978 | Lowrie |
| 4,177,032 | A | | 12/1979 | Selden |
| 4,278,490 | A | | 7/1981 | Pistole et al. |
| 4,288,277 | A | | 9/1981 | Siilats |
| 4,341,368 | A | | 7/1982 | Thompson et al. |
| 4,429,824 | A | | 2/1984 | Woodward |
| 4,436,574 | A | | 3/1984 | Long et al. |
| 4,462,787 | A | | 7/1984 | Bogardus et al. |
| 4,525,132 | A | | 6/1985 | Williams |
| 4,610,422 | A | | 9/1986 | Kraiss |
| 4,693,678 | A | | 9/1987 | Von Volkli |
| 4,861,247 | A | | 8/1989 | Schimanek |
| 4,942,653 | A | | 7/1990 | Hawkinson |
| 4,954,209 | A | | 9/1990 | Baron |
| 5,022,845 | A | | 6/1991 | Charlson et al. |
| 5,122,323 | A | | 6/1992 | Sullivan |
| 5,193,737 | A | | 3/1993 | Carraher |
| 5,199,631 | A | | 4/1993 | Anderson et al. |
| 5,226,997 | A | * | 7/1993 | Vallier ..... 156/228 |
| 5,228,374 | A | | 7/1993 | Santeramo |
| 5,266,137 | A | | 11/1993 | Hollingsworth |
| 5,304,057 | A | | 4/1994 | Celerier et al. |
| 5,477,613 | A | | 12/1995 | Bales et al. |
| 5,477,913 | A | | 12/1995 | Polk et al. |
| 5,597,435 | A | * | 1/1997 | Desautels et al. ..... 156/245 |
| 5,613,299 | A | | 3/1997 | Ring et al. |
| 5,768,778 | A | | 6/1998 | Anderson et al. |
| 5,773,047 | A | | 6/1998 | Cloud |
| 6,123,170 | A | | 9/2000 | Porte et al. |
| 6,308,408 | B1 | | 10/2001 | Myers |
| 6,330,792 | B2 | | 12/2001 | Cornelius et al. |
| 6,458,309 | B1 | | 10/2002 | Allen et al. |
| 6,723,272 | B2 | | 4/2004 | Montague et al. |
| 6,755,280 | B2 | | 6/2004 | Porte et al. |
| 6,997,429 | B2 | | 2/2006 | Meinrad |
| 7,125,237 | B2 | | 10/2006 | Buge et al. |
| 7,166,251 | B2 | | 1/2007 | Blankinship |
| 7,410,352 | B2 | | 8/2008 | Sarh |
| 7,497,679 | B2 | | 3/2009 | Mamada |
| 7,624,488 | B2 | | 12/2009 | Lum |
| 7,640,961 | B2 | | 1/2010 | Stubner et al. |
| 7,707,708 | B2 | | 5/2010 | Douglas et al. |
| 7,861,394 | B2 | | 1/2011 | Douglas et al. |
| 2002/0104606 | A1 | * | 8/2002 | Ohzuru et al. ..... 156/140 |
| 2002/0135090 | A1 | | 9/2002 | Koren |
| 2003/0025232 | A1 | | 2/2003 | Slaughter et al. |
| 2004/0013762 | A1 | | 1/2004 | Bianchini |
| 2004/0070108 | A1 | | 4/2004 | Simpson et al. |
| 2004/0207108 | A1 | | 10/2004 | Pacchiana et al. |
| 2006/0225265 | A1 | | 10/2006 | Burnett et al. |
| 2008/0116607 | A1 | | 5/2008 | Miedema |
| 2008/0246175 | A1 | | 10/2008 | Biornstad et al. |

FOREIGN PATENT DOCUMENTS

| | | | |
|---|---|---|---|
| DE | 1504597 | | 5/1969 |
| DE | 1504597 | A | 5/1969 |
| DE | 2259690 | | 6/1974 |
| DE | 2259690 | A | 6/1974 |
| DE | 2352373 | | 4/1975 |
| DE | 2352373 | A | 4/1975 |
| DE | 2652862 | | 4/1978 |
| DE | 2652862 | B1 | 4/1978 |
| EP | 0184759 | | 6/1986 |
| EP | 0184759 | A2 | 6/1986 |
| EP | 1767325 | | 3/2007 |
| EP | 1767325 | A2 | 3/2007 |
| WO | 92/14672 | A | 9/1992 |
| WO | 9214672 | | 9/1992 |
| WO | 2009150401 | | 12/2009 |
| WO | 2009150401 | A1 | 12/2009 |

OTHER PUBLICATIONS

Restriction Requirement dated Apr. 12, 2011 in U.S. Appl. No. 12/263,915.

Notice of Allowance dated May 25, 2011 in U.S. Appl. No. 12/263,915.

Extended Search Report and European Search Opinion dated Mar. 4, 2010 in European Application No. 09013714.2.

American Solving, Inc., "Rig Set Modular Air Bearing System" [online), retrieved from the Internet: http://www.solvinginc.com/rig_set_modular-Air_bearing_system.htm>, [Retrieved on Mar. 15, 2007 by the EPO]; p. 1 -p. 2.

Partial European Search Report dated Feb. 5, 2007 in European Application No. 06019100.4.

Office Action dated Apr. 26, 2012 in U.S. Appl. No. 13/217,709.

Final Office Action dated Oct. 25, 2012 in U.S. Appl. No. 13/217,709.

Notice of Allowance dated Feb. 6, 2013 in U.S. Appl. No. 13/217,709.

Extended Search Report dated Jul. 10, 2014 in European Application No. 14166664.4.

Office Action dated Jun. 23, 2016 in U.S. Appl. No. 14/969,983.

Communication Under Rule 71(3) EPC dated Oct. 14, 2016 in European Application No. 14166664.4.

Extended EP Search Report in EP Appln. No. 06019100.4 dated Apr. 2, 2007.

* cited by examiner

MULTI-SEGMENT TOOL AND METHOD FOR COMPOSITE FORMATION

Matter enclosed in heavy brackets [ ] appears in the original patent but forms no part of this reissue specification; matter printed in italics indicates the additions made by reissue; a claim printed with strikethrough indicates that the claim was canceled, disclaimed, or held invalid by a prior post-patent action or proceeding.

RELATED APPLICATIONS

This application *is a reissue application of U.S. Pat. No. 8,394,315, issued on Mar. 12, 2013 (FKA U.S. Ser. No. 13/217,709, filed on Aug. 25, 2011), entitled, "MULTI-SEGMENT TOOL AND METHOD FOR COMPOSITE FORMATION." The '315 patent* is a divisional of U.S. application Ser. No. 12/263,915 filed Nov. 3, 2008, [the content of which is] *entitled "MULTI-SEGMENT TOOL AND METHOD FOR COMPOSITE FORMATION," which issued as U.S. Pat. No. 8,025,499 on Sep. 27, 2011. Both of the aforementioned patents are* incorporated *herein* by reference in [its] *their* entirety.

FIELD OF THE INVENTION

The invention is directed to a multi-segment tool and method for vacuum forming a composite part in general, and more specifically a tool and method relating to composite formation of an aircraft nacelle and related parts.

BACKGROUND

Aircraft structures have many components that have complex shapes with multiple curvatures. For example, various complex shapes are found in aircraft nacelle and pylon systems, thrust reversers and rocket thruster chambers, among others. Several methods are known to form complex shapes. For thermoplastic and thermoset polymers, multiple tools can be used in injection and compression molding operations to form complex shapes. Metal forming techniques have used casting plugs to facilitate the formation of metallic rocket thrust chambers having hour-glass configurations. These methods, however, are not readily adaptable for forming complex parts using vacuum bag composite techniques.

Vacuum bag forming is a method of composite fabrication that can be used to form complex shapes using multiple tools. In vacuum bag forming, a vacuum pulls a preform around the contours of a tool. Where multiple tools are used to form composite parts, there must be sufficient vacuum sealing between the tools. Vacuum integrity and proper tool alignment is important to achieve desired end-product form and properties. Because the vacuum pulls a preform into every contour, seam defects result if there is less than precise alignment between the tools. Mechanical fasteners such as bolts and the like have attempted to ensure alignment among multiple tools. Such systems, however, can be cumbersome, costly and inadequate to minimize seam defects. In terms of vacuum integrity, gaskets, o-rings and similar devices have been used to improve vacuum integrity between adjacent tools. These attempts often result in less than full vacuum integrity leading to possible product defects, poor resin cure and poor resin-to-matrix migration, contributing to potential product deficiencies. In response, some have attempted to use multiple vacuum barriers to ensure vacuum integrity, but such solutions increase processing complexity and cost.

A need has arisen for the ability to form multiple curvature composites, either integrally formed or formed with minimal sub-parts, where the seams are minimized, sufficient vacuum integrity is achieved and misalignment of tools is reduced. Further, there is a need for an efficient method of forming complex shapes while providing flexibility to accommodate changing design constraints.

SUMMARY

Figure 1A:
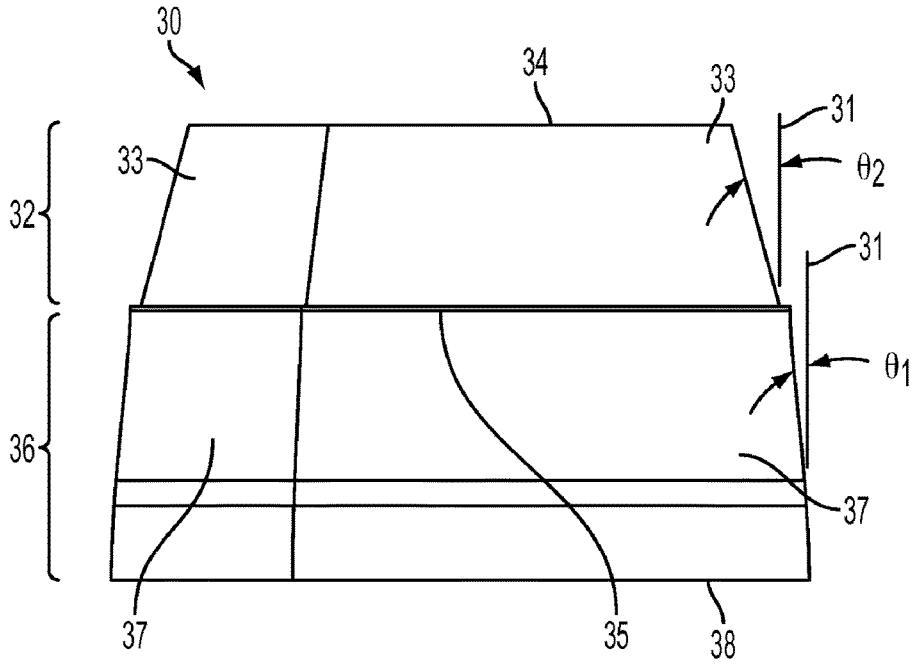
FIGS. 1A and 1B show a first tool of a multi-segment tool according to a first embodiment.

A multi-segment tool for vacuum forming a composite part can include a first tool having a first surface and a second surface. A second tool can have an opening. The second tool can be capable of receiving the first tool through the opening. A second tool can be further capable of being positioned on the first tool in a location other than the first surface or second surface. The first tool can receive at least a portion of a preform composite. The second tool can receive at least a portion of the preform composite. The first tool can have a vacuum barrier attached to the first surface and to the second surface, wherein a vacuum barrier encapsulates the preform composite and the second tool.

A tooling system for vacuum forming a composite part can include a first tool having a core and a base with the core extending upwards from the base. A second tool can be positioned upon the core in such a way that a portion of the core extends above the second tool. The tooling system can further include a composite formed on the first tool and the second tool, the composite having a complex shape. A vacuum barrier can be pressure sealed to the base and to the portion of the core that extends above the second tool. The vacuum barrier can be capable of forming a pressure seal that includes the composite, the first tool and the second tool.

A method of forming a composite part can include providing a first tool and positioning a second tool on a first tool. The second tool can have an opening capable of receiving the first tool through the opening. A method can include applying a composite preform on at least a portion of the second tool. A method can include vacuum sealing the composite preform by securing a vacuum barrier to the first tool while the preform and second tool can be encapsulated within a vacuum barrier. A method can further include curing the preform to form a composite part.

The foregoing and other features, aspects and advantages of the invention will be apparent from a reading of the following detailed description together with the accompanying drawings, which are described below.

Description

Certain exemplary embodiments of the present invention are described below and illustrated in the accompanying Figures. The embodiments described are only for purposes of illustrating embodiments of the present invention and should not be interpreted as limiting the scope of the invention. Other embodiments of the invention, and certain modifications and improvements of the described embodiments, will occur to those of skill in the art, and all such alternate embodiments, modifications and improvements are within the scope of the present invention.

The tool and method in general comprises two or more tools that can mate with one another to form a desired mold profile. Composite materials are then applied upon or laid up on the tools. The composite can be then encased within a vacuum barrier or bag, which can be sealed around the composite and secured to surfaces of one of the tools. After curing, the parts can be selectively removed, resulting in a composite structure having a complex shape. In a preferred embodiment, a 360 degree complex shape can be produced for use as, for example, a one-piece inner barrel of an aircraft engine nacelle.

More specifically, a first embodiment for a tool or system for vacuum forming a composite part is shown in FIGS. 1 through 7. FIG. 1A shows a first tool 30. First tool 30 can have a top portion 32 and a bottom portion 36. Top portion 32 has a top edge 34, and bottom portion 36 has a bottom edge 38. In the embodiment shown, both top edge 34 and bottom edge 38 are circular and form planes that are substantially in parallel orientation with one another. First tool 30 can be a 360 degree tool as shown. A 360 degree tool refers to a tool that can be used to mold 3-dimensional parts that have some type of void or internal open cavity therewithin. Such parts in a preferred embodiment are formed partially or completely around the tool, thereby creating a partial or extended annular opening in the part. For example, 360 degree tools can be used in the aircraft industry to produce nacelles, pylon systems, thrust reversers, rocket thruster chambers, etc. In a preferred embodiment, the 360 degree tool has an uppermost portion that has a smaller cross sectional area than portions elsewhere on the tool, thereby permitting the part to be removed upwardly along an axis substantially aligned with the annular opening formed by the tool. Thus, a 360 degree tool can be frusto-cone or frusto-pyramid to facilitate creation of such annual parts.

First tool 30 can have outer shape profiles designed as necessary to conform to the desired composite part and/or to mate with additional tools. Bottom portion 36 can have bottom side 37 that extends upward and inwardly from bottom edge 38. Similarly, top portion 32 can have an alignment bevel 33 that also slopes upward and inwardly towards top edge 34. Alignment bevel 33 can also facilitate tool alignment. To facilitate removal of tool(s) and/or composite part(s), alignment bevel 33 and bottom side 37 preferably have right (90°) or acute (less than 90°) angles $\theta_1$, $\theta_2$, respectively, (as shown in FIG. 1A) measured with respect to a line 31 orthogonal to a plane defined by bottom edge 38.

Figure 1B:
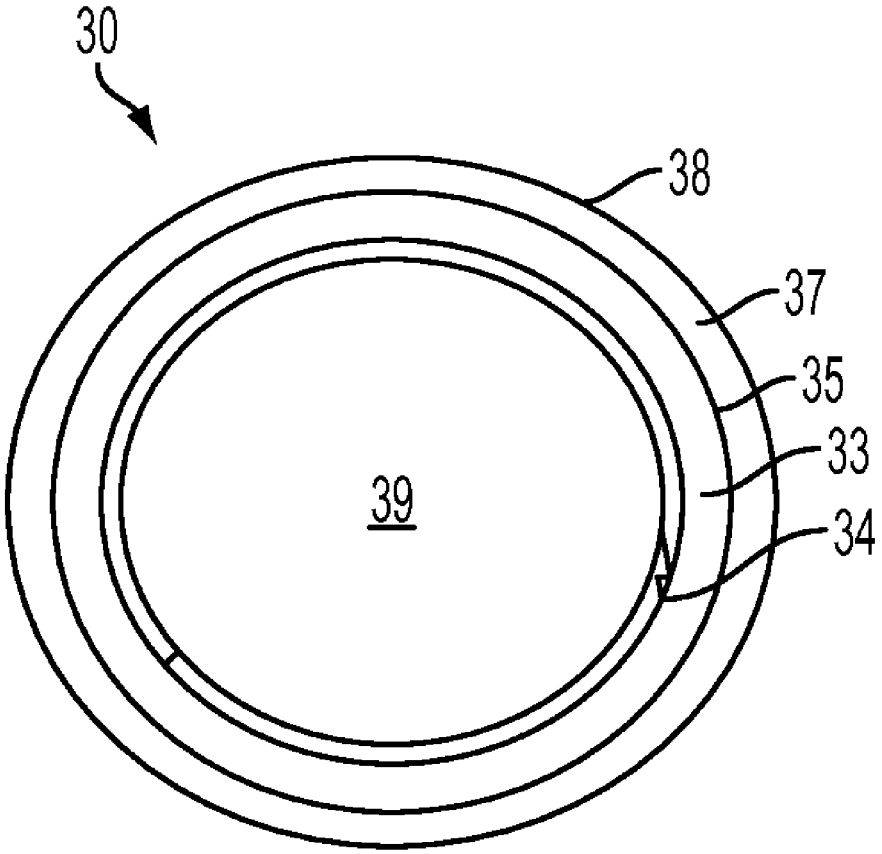

First tool 30 has an alignment ridge 35 as shown, for example, in FIGS. 1A and 1B. Alignment ridge 35 in this embodiment can be a lip, machined step, indentation or projection on the first tool 30. More than one alignment ridge 35 can be present on first tool 30, to facilitate positioning the first tool 30 with a mating tool having a complex profile, or with additional tools. Alignment ridge 35 is formed circumferentially around first tool 30, and in parallel configuration to the plane formed by bottom edge 38. In alternate embodiments, alignment ridge 35 can form any angle with respect to the plane formed by bottom edge 38. Also, alignment ridge 35 can be any shape as determined by the needs of mating alignment of additional tools. A clocking pin (not shown) can be located on alignment ridge 35 to facilitate the location and alignment of additional tools.

FIG. 1B is a top view of first tool 30, showing the bottom edge 38, bottom side 37, alignment ridge 35, alignment bevel 33 and top edge 34. Interior space 39 facilitates cooling and access to mechanical and vacuum components.

Figure 2A:
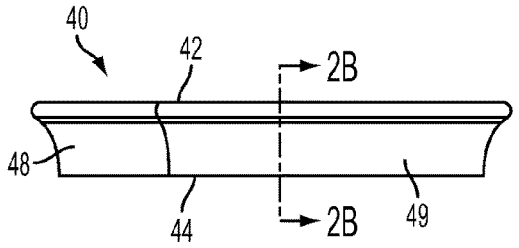
FIGS. 2A, 2B and 2C show a second tool of a multi-segment tool.
Figure 2B:
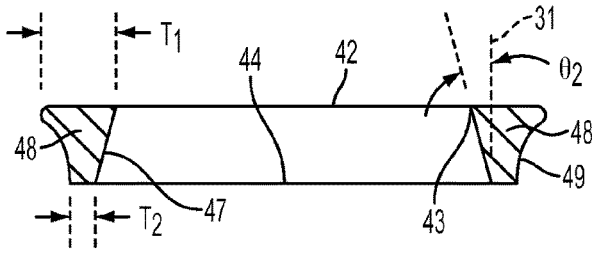
Figure 2C:
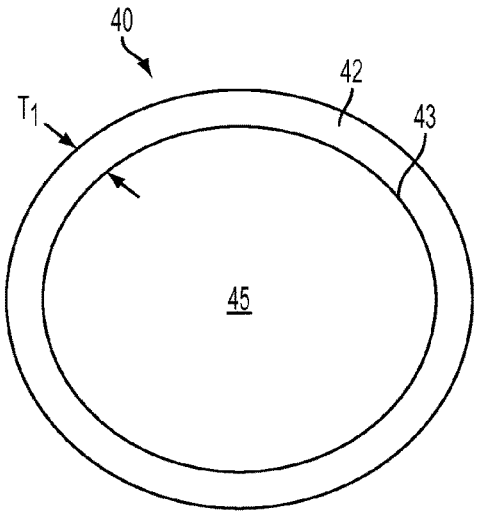

FIGS. 2A, 2B and 2C show an embodiment of a second tool 40, which is capable of mating alignment with first tool 30. Second tool 40 has a top 42, bottom 44 and a second tool side 48 extending therebetween.

FIG. 2B shows a cross section, taken along lines 2B-2B of FIG. 2A. Top 42, bottom 44 and second tool side 48 are shown. Side 48 has a thickness $T_1$ at the top and a thickness $T_2$ at the bottom. Side interior wall 47 can be configured to fit atop the first tool 30 and be positioned adjacent to alignment bevel 33. To accomplish this, wall 47 can be oriented at angle $\theta_2$ to sit flush against alignment bevel 33, which is the same angle $\theta_2$ orientation of the alignment bevel 33 of the first tool top portion 32 (see FIG. 1A). Interior edge 43 located at the top 42 of second tool 40 defines an opening, or an interior cross-sectional area 45, as shown in FIG. 2C.

FIG. 2C is a top view of second tool 40 shown in FIG. 2A, showing the cross-sectional area 45 defined by the interior edge 43, and the top thickness $T_1$. This interior cross-sectional area 45 allows the second tool 40 to fit over the top portion 32 of the first tool 30.

As shown in FIGS. 2A and 2B, an outer wall 49 of side 48 of the second tool 40 generally extends outwards from the bottom 44, in an inverted frusto-cone shape. Other examples of a shape of a second tool include an inverted frusto pyramid, where the top perimeter also is larger than the bottom perimeter. The second tool 40 can be integrally formed, such as shown in FIGS. 2A, 2B and 2C, or can comprise several discrete segments (not shown) disposed radially or circumferentially to form a 360 degree part.

Figure 3:
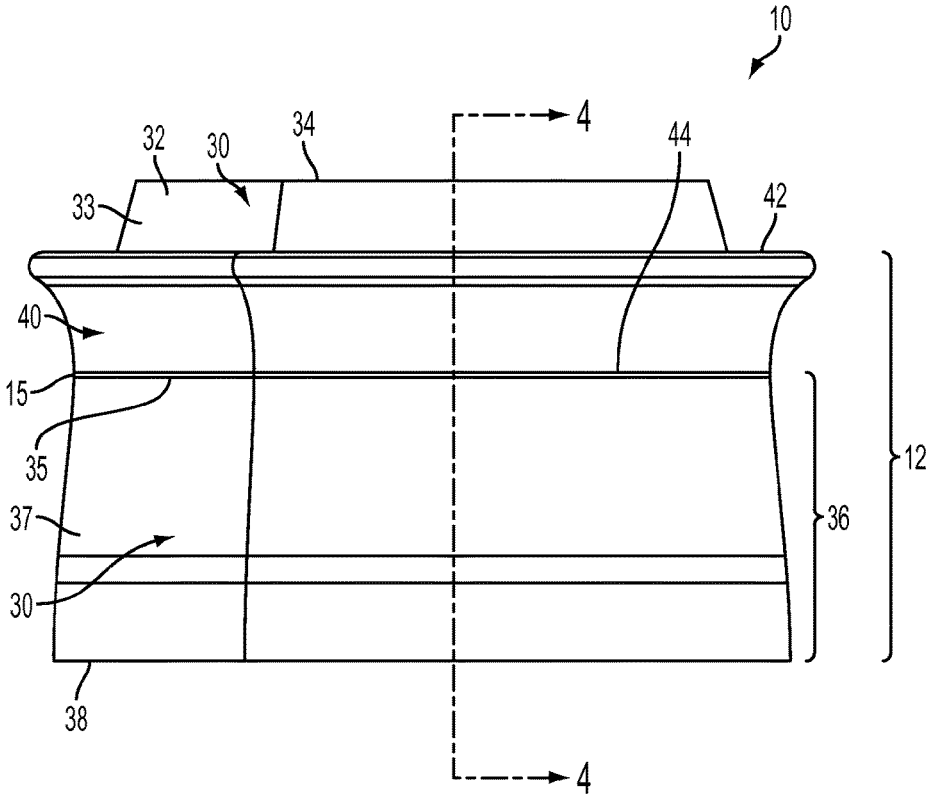
FIG. 3 shows a multi-segment tool.
Figure 4A:
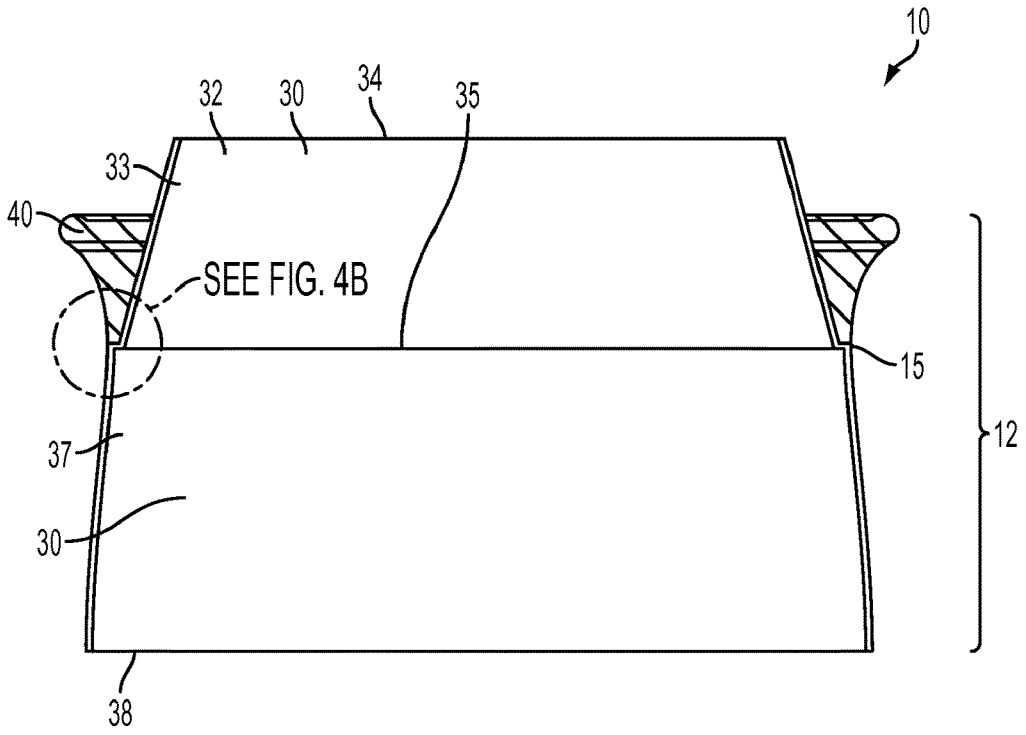
FIGS. 4A and 4B show sections of the multi-segment tool taken along lines 4-4 of FIG. 3.
Figure 4B:
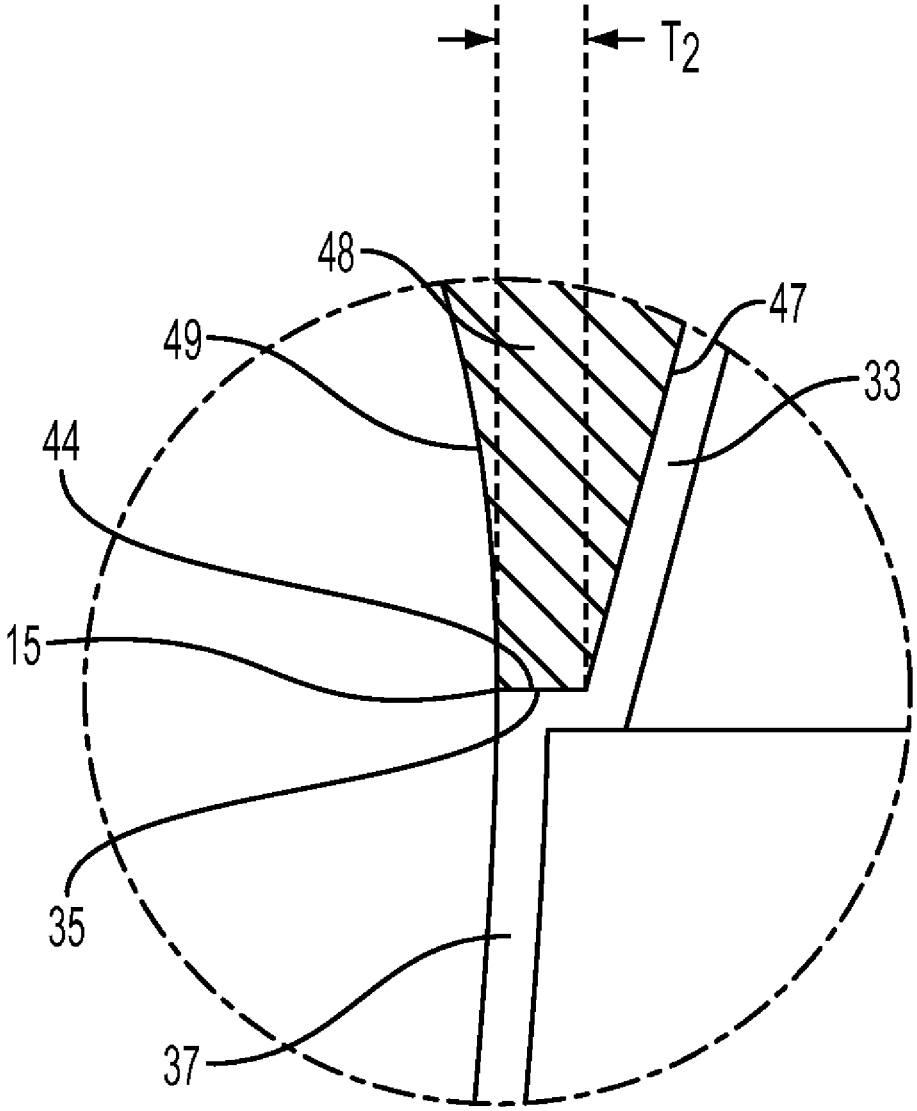

As shown in FIGS. 3, 4A and 4B, the second tool 40 can be lowered onto and placed atop first tool 30. When the first tool 30 and second tool 40 are assembled, a multi-segment tool 10 is formed. Multi-segment tool 10 has an outer shape 12 that will become the form on which a composite is laid, as discussed below. The embodiments shown reflect a configuration whereby top edge 34 of first tool 30 extends above the top 42 of second tool 40.

FIG. 4A is a cross-section taken along lines 4-4 of FIG. 3. Second tool 40 is shown placed upon the top portion 32 of the first tool 30. FIG. 4B is an exploded view of the circled area shown in FIG. 4A, and shows the interior wall 47 of second tool 40 adjacent to the alignment bevel 33 of the first tool 30. The bottom 44, having a thickness $T_2$, of side 48 of the second tool 40 is positioned atop the alignment ridge 35 of the first tool 30. The second tool 40 meets the alignment ridge 35 at joint 15.

First and second tools 30, 40 can be formed from a variety of non-metallic materials such as composites or metallic alloys such as, for example, aluminum, nickel, iron, steel or a substantially inexpansible alloy, such as Invar® nickel steel alloy, as needed. Selection of a tool material typically is based on forming method, composite part tolerances, number of curing and/or heating cycles, coefficient of thermal expansion of the tooling material, desired or required surface condition of the composite part, composite constituents, and cost, as is generally known in the art. In a preferred embodiment, the tools are formed of Invar® alloy.

Figure 5:
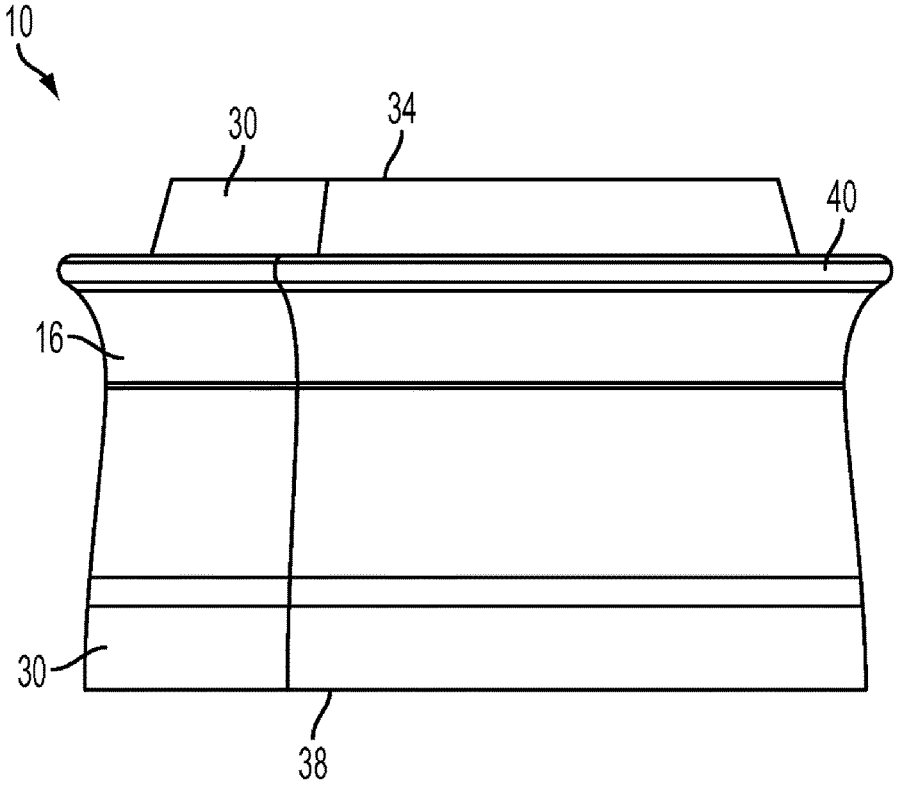
FIG. 5 is a side view of a multi-segment tool with a composite placed thereon.

FIGS. 5 through 7B show the addition of a composite part 16 to multi-segment tool 10. In FIG. 5, composite part 16 can be laid upon the multi-segment tool 10 by known methods, including for example, laying together individual plies of a pre-impregnated composite to create the final laminated structure. In a preferred embodiment, the composite is prepared by hand lay up of pre-impregnated plies of a graphite fabric. The composite part 16 can be a complex shape due to the geometries of the first part 30 and second part 40.

The composite part 16, which sometimes is called a preform prior to curing, is typically comprised of a reinforcement and a matrix. Reinforcements can be carbon, aramid fibers, para-aramid fibers, glass fibers, silicon carbide fibers, high strength polyethylene or other composite fiber materials as is known in the art. The reinforcement material can be short or long fibers, woven, laid-up reinforcements, laminates or any combination thereof. The matrix can be a thermoset or thermoplastic polymeric resin such as polyester, vinyl ester, epoxy, phenolic, polyimide, polyamide, polypropylene, PEEK or baselimide. In a preferred embodiment, the reinforcement is graphite and the matrix is epoxy.

Figure 6:
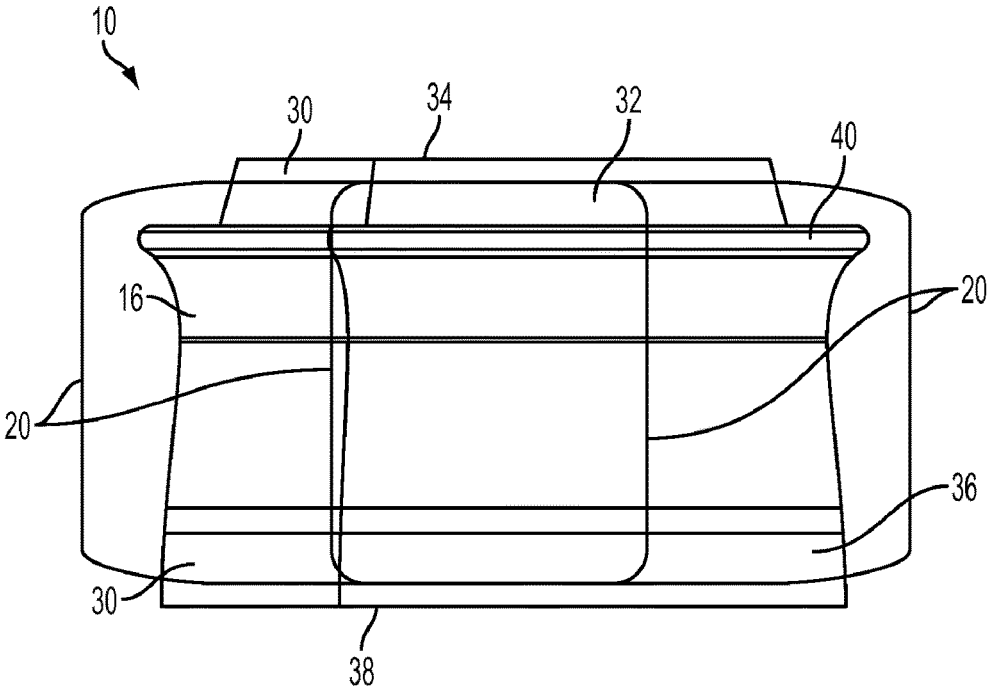
FIG. 6 is a side view of a multi-segment tool and composite encased in an illustrative vacuum barrier.

FIG. 6 illustrates the addition of a vacuum barrier 20 that encases the composite part 16 and portions of the multi-segment tool 10. Vacuum barrier 20 can be secured and sealed to bottom portion 36 and top portion 32 of first tool 30, using securing methods known to those of skill in the art. In a preferred embodiment, the vacuum barrier 20 is sealed by a sealant tape. Sealed in this manner, the vacuum barrier 20 encases the composite part 16 and the second tool 40.

Vacuum barrier 20 can be a flexible polymeric material, or other material as is known in the art, sufficient to withstand temperatures and pressures encountered with vacuum bag composite curing. A vacuum is drawn from the space between vacuum barrier 20 and multi-segment tool 10 using a vacuum source (not shown) such as a compressor or venturi pump as is known in the art. Pressure approaching approximately one atmosphere forces composite part 16 against the outer profile 12 of multi-segment tool 10.

After securing the vacuum barrier 20 and achieving the desired pressure conditions, the composite part 16 is then cured. Cure, or curing, as used herein, refers to the process that results in cross-linking or solidification of a matrix and reinforcement. Curing can occur in pressurized vessels at elevated temperatures in devices such as an autoclave, as is known in the art. In an alternate embodiment, curing can occur at ambient temperature and/or atmospheric pressures. Multiple cures cycles can be used as the need may arise. For example, a preform can undergo a first and second cure to form composite part 16. In one example using the tool described herein, a woven carbon fiber-epoxy composite part 16 was exposed to about 350° F. simultaneously with pressures ranging between about 35 psi to about 100 psi, preferably from about 70 to 80 psi, for about 120 minutes inside an autoclave. The particular temperature-pressure-time variable can be adjusted according to the particular reinforcement and matrix combination used in the preform, as is known in the art.

Figure 7A:
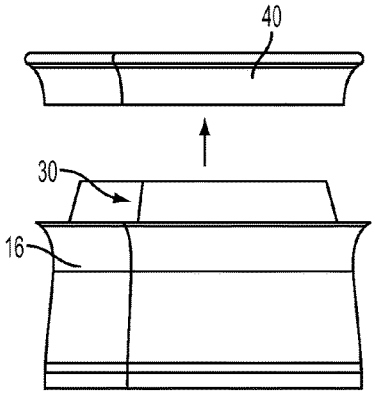
FIGS. 7A and 7B show removal of the second tool and composite part from the first tool.
Figure 7B:
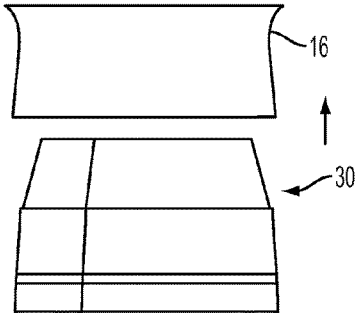

FIGS. 7A and 7B show disassembly following cure and removal of vacuum barrier 20. The second tool 40 can be first lifted or axially removed from the first tool 30 as shown in FIG. 7A. As shown in FIG. 7B, composite part 16, having a complex shape, can then be removed axially from the first tool 30.

A second embodiment of a tool or system for forming a composite part is shown in FIGS. 8 through 16.

Figure 8:
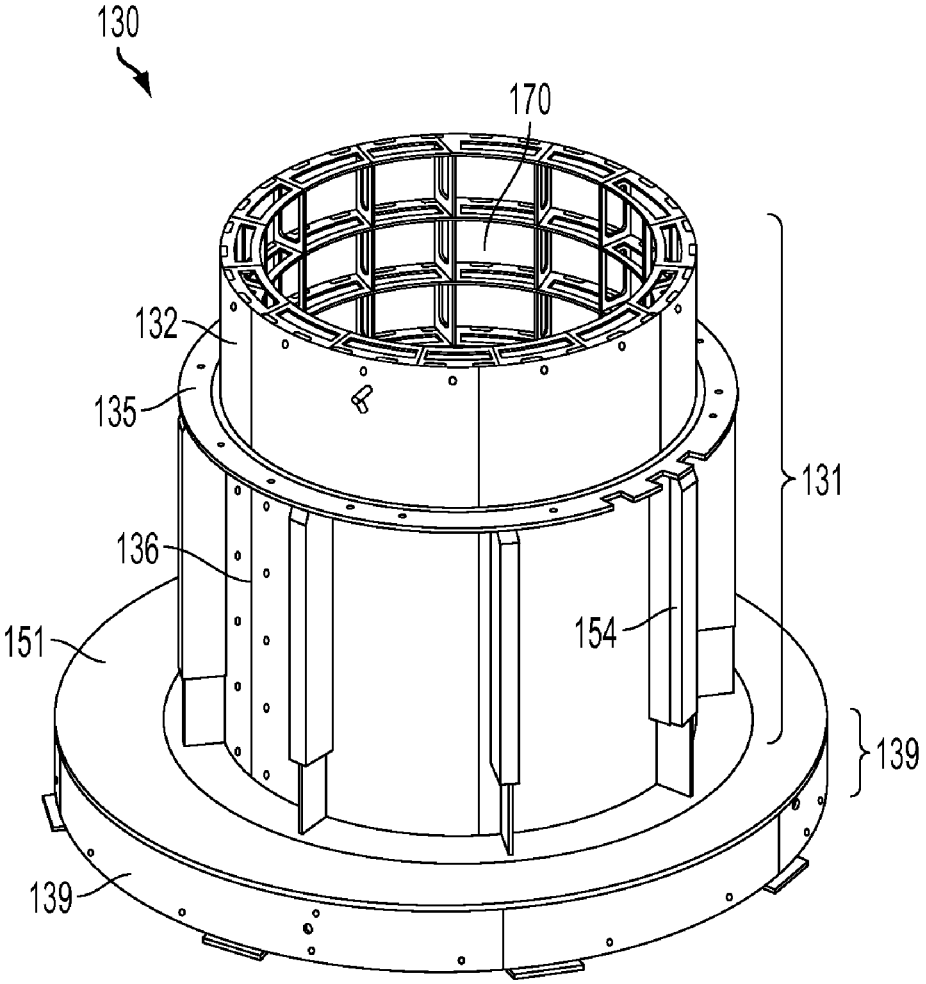
FIG. 8 is a top perspective view of a second embodiment of a first tool of a multi-segment tool.

Referring to FIG. 8, first tool 130 comprises a core 131 shown sitting atop a base 139. Core 131 comprises top portion 132 and middle portion 136. A ridge 135 is located between the top portion 132 and middle portion 136. Core 131 can be positioned off-center of first tool base 139 as shown. Such an off-center placement allows for support for a non-concentric second tool 140. In alternate embodiments, core 131 can be centered on first tool base 139 to support concentric second and third tools 140 and 160. Alignment guides 154 can be located on the middle portion 136 of the core 131. Guides 154 can be located intermittently in relation to each other around middle portion 136. Preferably four (4) guides are used, and are parallel to one another and positioned circumferentially around the middle portion 136. Although the top portion 132 of first tool 130 can be a cylinder as shown, top portion 132 can also slope inwards in a truncated conical shape (not shown). The open inner volume 170 of first tool 130 helps provide air circulation and minimize tool heat-up during subsequent curing. The base 139 has a top surface 151.

Figure 9:
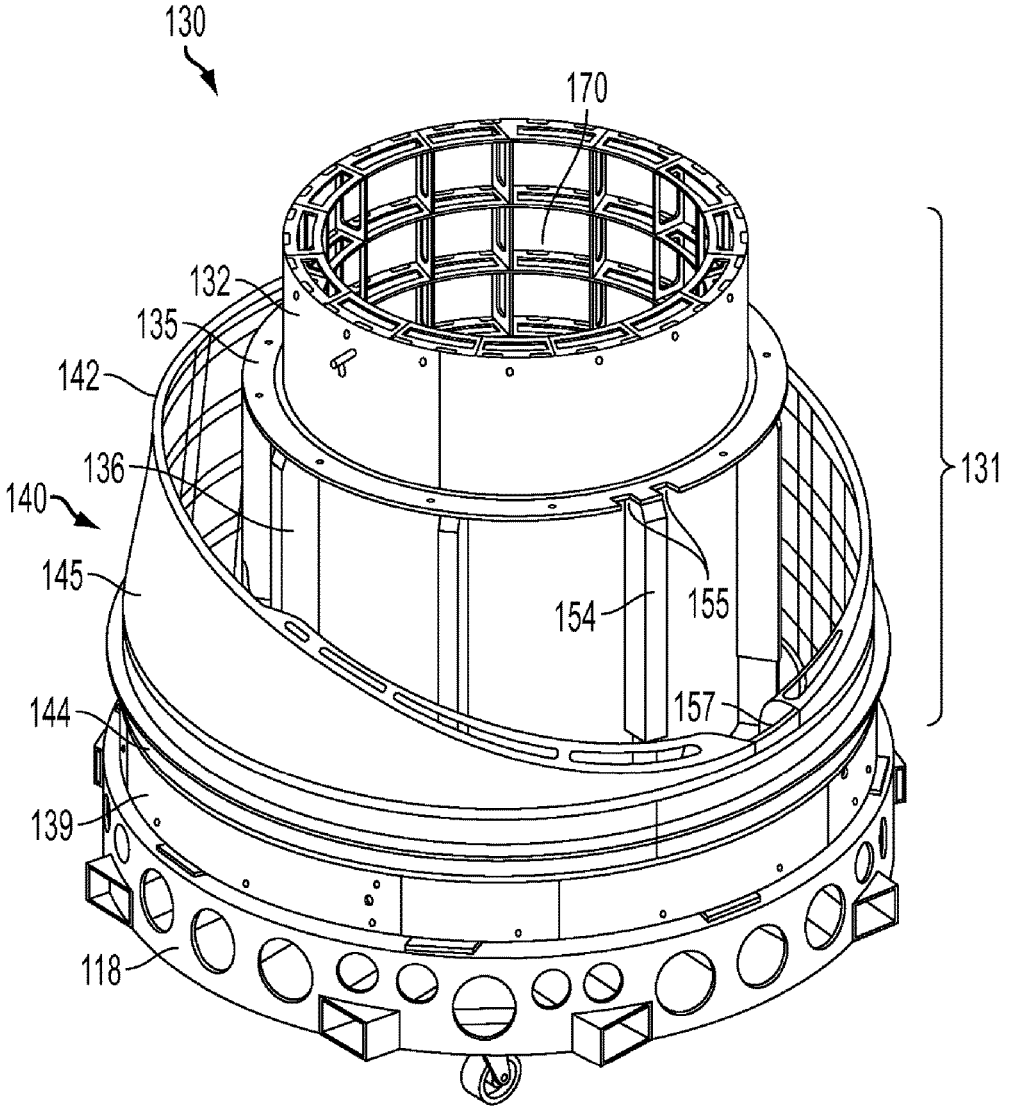
FIG. 9 is a top perspective view of a first and second tool.

FIG. 9 shows the addition of a second tool 140 and a transport frame 118. Second tool 140 can be positioned atop top surface 151 (not shown in FIG. 9) of first tool 130. As shown also in FIG. 10A, recess 157 on the interior side of the second tool 140 can cooperate with guides 154 to facilitate positioning and alignment of the second tool 140 over first tool 130. So positioned, supporting core 131 extends up through the second tool 140 leaving guides 154 partially exposed and ready to receive additional tools. Transport frame 118 can support and transport the assembled multi-segment tool as needed. Transport frame 118 can be steel or other metallic alloys.

Second tool 140 has a top edge 142 and bottom edge 144. Bottom edge 144 is generally circular and planar. As shown, top edge 142 also is shown generally non-parallel to the plane formed by bottom edge 144. The use of such a non-parallel interface, also called a spline form split line, can assist in removal of the composite from the tool following curing. In practice, various non-parallel interfaces can be used, but preferably the angle between the interfaces will be greater than about five degrees. Bottom profile 145 defines the surface to which a preform will later be partially applied, as discussed below.

Figure 10A:
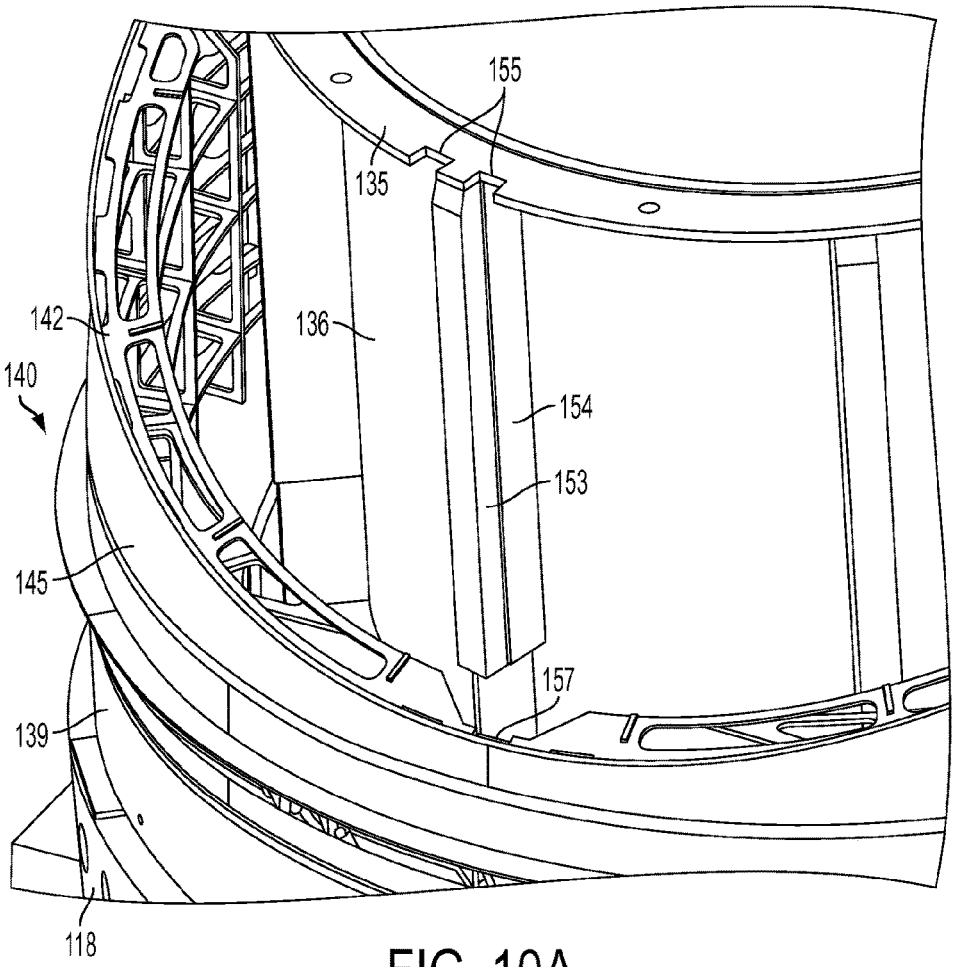
FIGS. 10A and 10B show alignment features of a multi-segment tool.
Figure 10B:
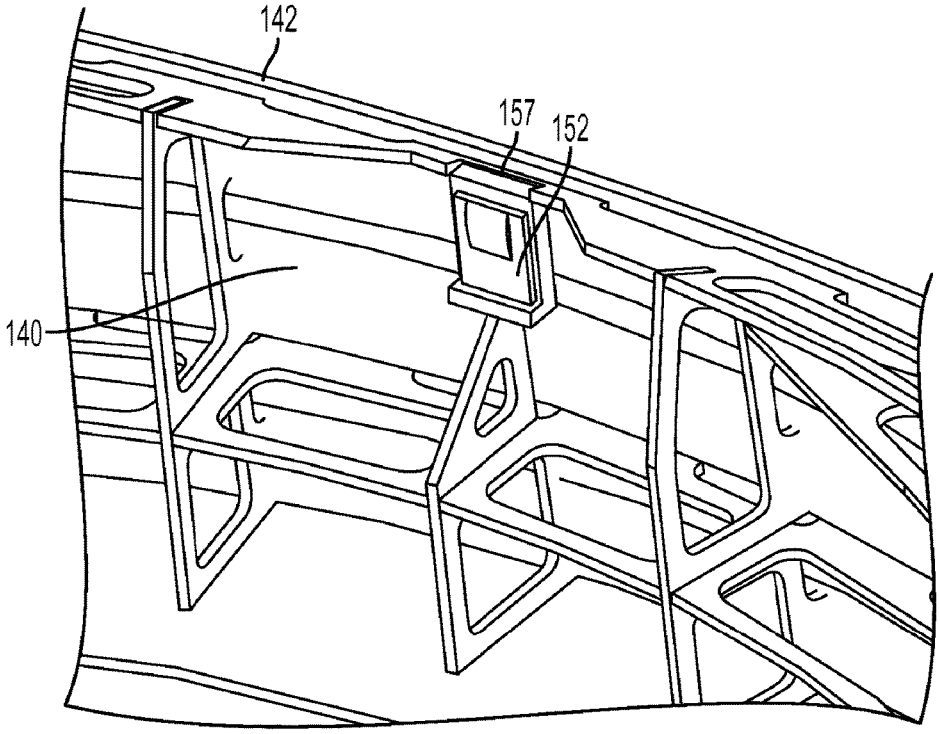

FIGS. 10A and 10B show details relating to a guide 154 and recess 157. Tongue 153 of guide 154 fits within recess 157 of the second tool 140 and assists in guiding and aligning the second tool 140 on to first tool 130. Notches 155 permit clearance for members 166 (shown in FIG. 12B) of third tool through ridge 135. A first index shoe 152, as shown in FIG. 10B, is located on the interior of the second tool 140 and facilitates alignment by receiving a second index shoe 156 of third tool 160 (shown on housing 163 in FIG. 12A). First and second index shoes 152 and 156 can help the second and third tools 140 and 160 form a smooth joint therebetween and limit deviation between the two tools. In a preferred embodiment, index shoe 152 has a recess into which projection from index shoe 156 fits.

Figure 11:
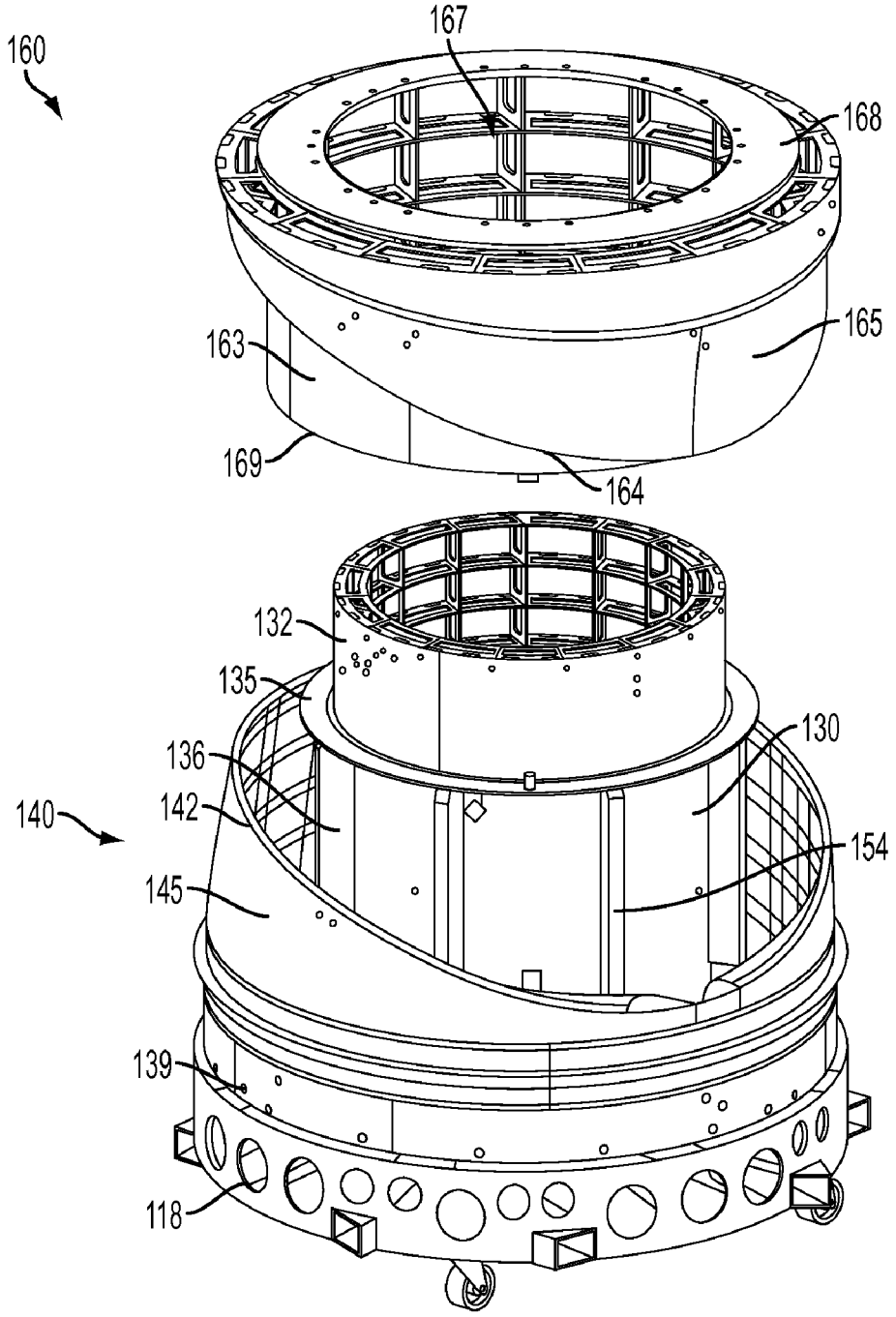
FIG. 11 is a top perspective assembly view of a first and second tool with a third tool being added.

FIG. 11 shows the addition of a third tool 160, ready to be lowered and positioned upon first tool 130 and into contact with the second tool 140 to form a multi-segment tool. Third tool 160 comprises a station datum plane 168, housing 163 and upper profile 165. The station datum plane 168 allows for the planar reference for coordination and fit between the tools. Station datum plane 168 can also allow for the verification of compliance with the desired contour tolerances. Station datum plane 168 also can provide support for fairings 126 (as shown in FIG. 13). A bottom edge 164 of upper profile 165 cooperates and mates with top edge 142 and lower profile 145 of second tool 140. An inner opening 167 of third tool 160 receives first tool 130. The housing 163 can have an interior lip (not shown) that cooperates and rests upon ridge 135. At the bottom of the housing 163, feet 169 (also shown in FIG. 12A) allow the tool to be placed on a hard surface without damage to the tool when not in use.

Figure 12A:
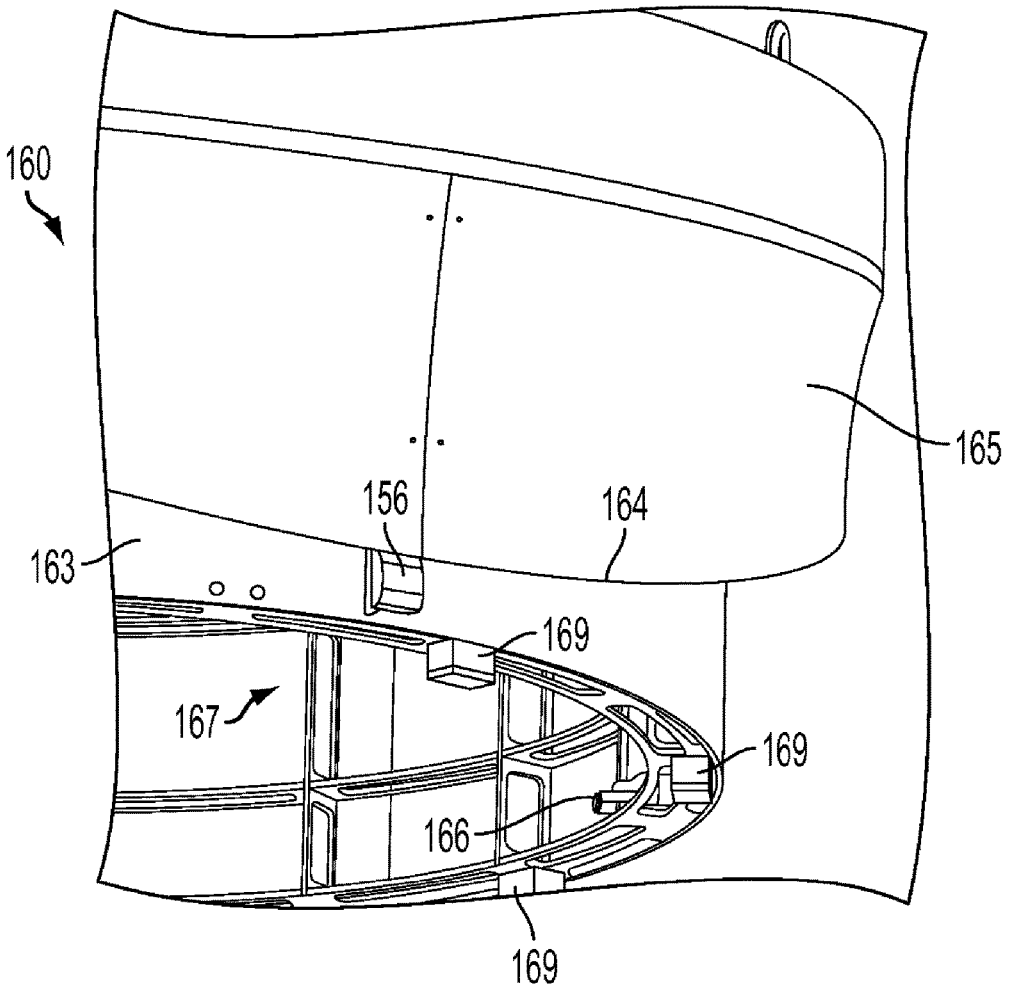
FIG. 12A is an exploded perspective view of a portion of the bottom of the third tool.
Figure 12B:
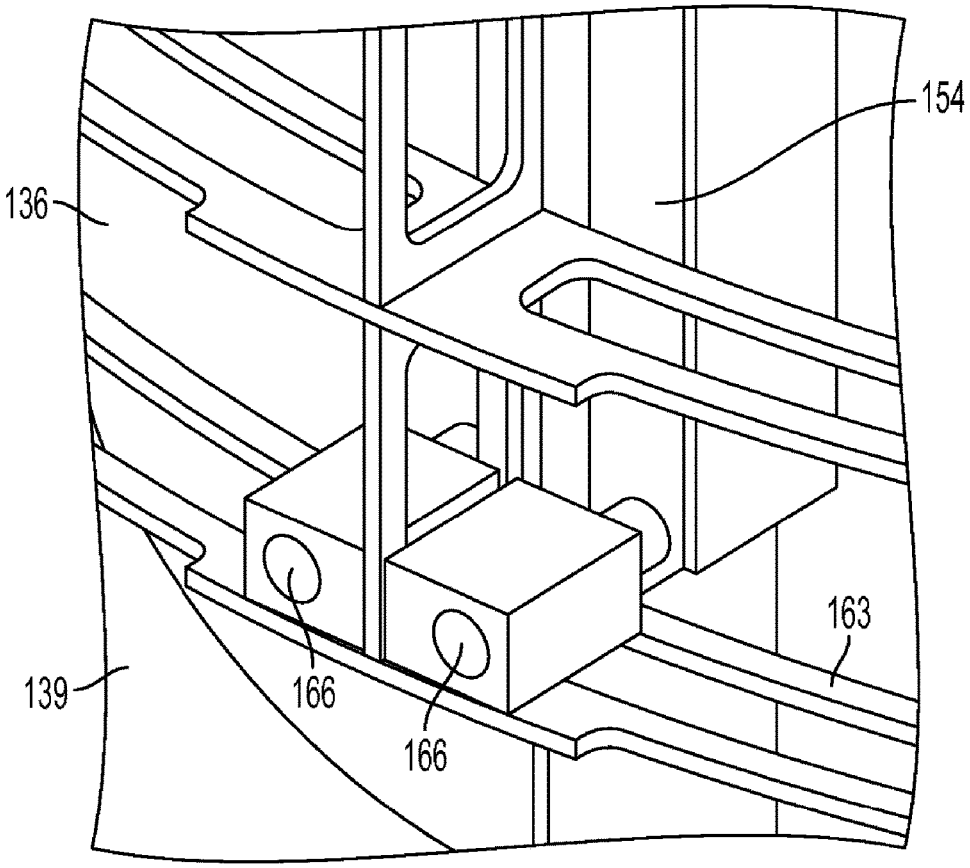
FIG. 12B is an exploded perspective view of a portion of the first tool and of the third tool.
Figure 13:
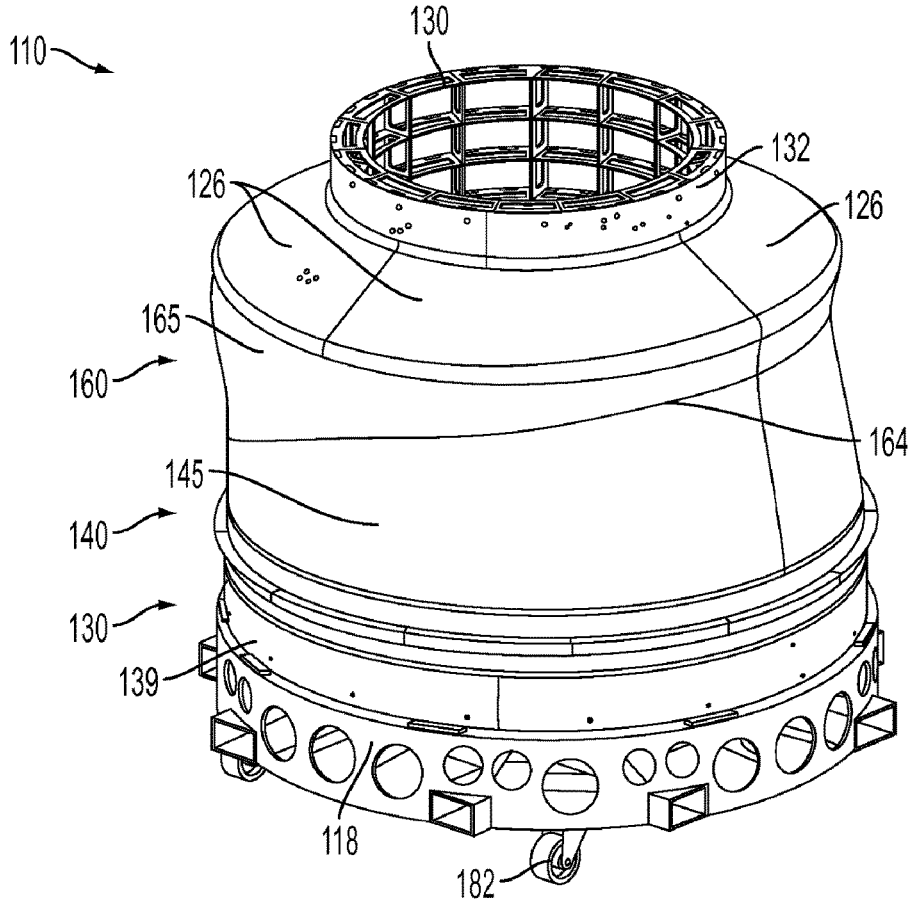
FIG. 13 shows a multi-segment tool on a frame.

FIGS. 12A and 12B show hardware useful for aligning first, second and third tools 130, 140, and 160. A second index shoe 156 can be positioned on housing 163. When installed, the second index shoe 156 is aligned with the first index shoe 152 on second tool 140 (as shown in FIG. 10B). As discussed above, the index shoes can axially engage through a tongue and groove or other suitable mechanical, electronic or magnetic linkage. Preferably, four pairs of index shoe pairs are located circumferentially on the third and second tools 160 and 140. The guides 154 (shown in FIG. 12B) of first tool 130 cooperate with alignment members 166 located on housing 163 of third tool 160. Alignment members 166 can provide a close tolerance radial index with guides 154 as shown in FIG. 12B. Thus, alignment members 166 can align and index first tool 130 and third tool 160. Index shoes 152 and 156 can align and index second tool 140 and third tool 160.

FIG. 13 shows an assembled multi-segment tool 110 also having fairings 126. Preferably four (4) fairings 126 can be positioned on top of third tool 160 and around the top portion 132 of the first tool 130. The fairings 126 can be formed from a lightweight fiberglass material. Other composites, metals and cured plastics capable of withstanding elevated temperatures can also be used. For example, light weight metallic alloys, such as aluminum and the like, can form fairings 126. Fairings 126 cover mechanical fasteners and lifting hardware or other high profile gaps on the station datum plane 168 (as shown in FIG. 11) and help prevent bag pinch around sharp objects present on the top of third tool 160. Casters 182 attached to the transport frame 118 aid in movement of the multi-segment tool.

In the assembled condition, multi-segment tool 110 comprises first tool 130, second tool 140 and third tool 160, assembled together. Lower profile 145 is mated to upper profile 165, and together form a surface to which a composite preform can be placed.

Figure 14:
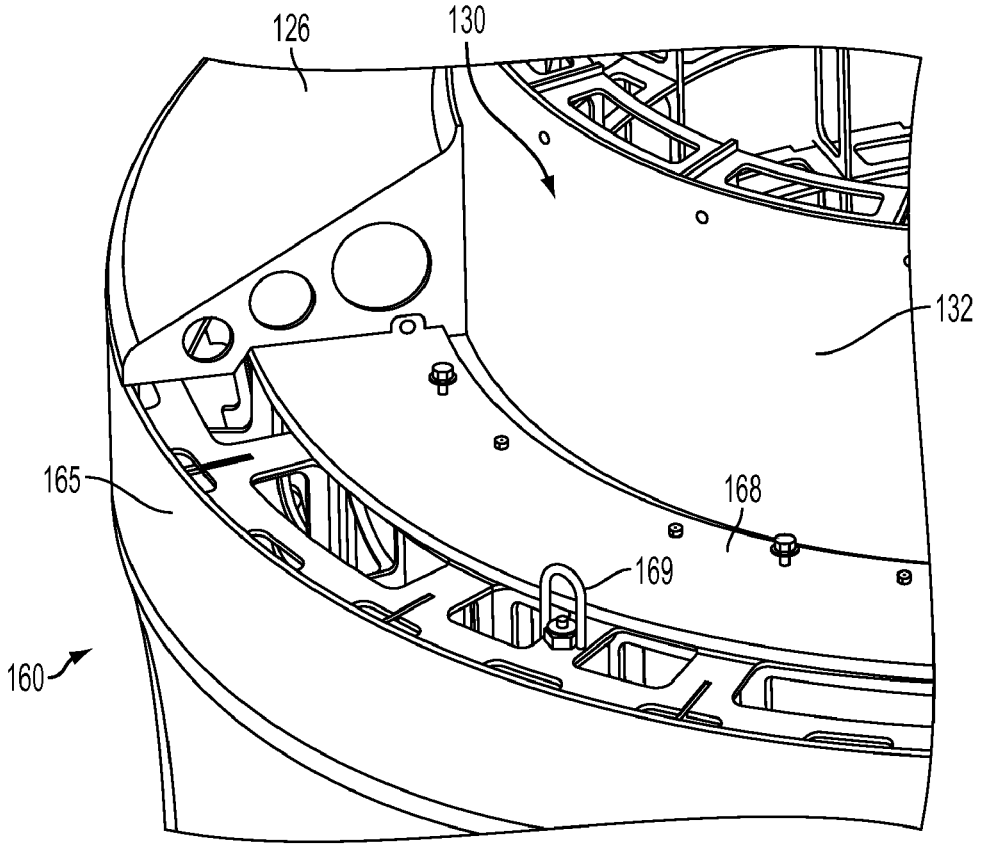
FIG. 14 is a cut away close-up of a multi-segment tool with one fairing removed.

FIG. 14 shows an exploded and partially disassembled view of the third tool 160, station datum plane 168 and fairings 126. Various mechanical fasteners and lifting hardware 169 on third tool 160 facilitate transport and positioning of third tool 160 around the top portion 132 of the first tool 130 and onto second tool 140. As shown, the top portion 132 extends above the third tool 160, and provides a surface to which a vacuum bag can be attached as discussed below.

Figure 15:
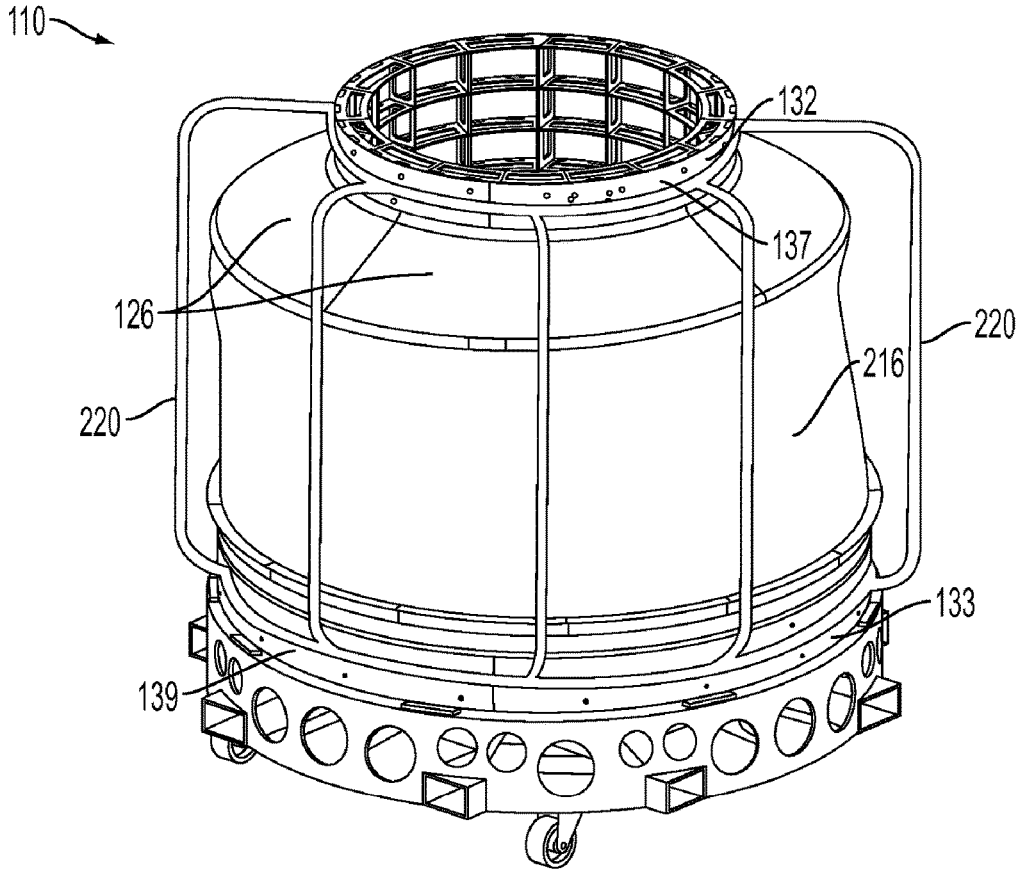
FIG. 15 shows a multi-segment tool with a composite and illustrative vacuum barrier

FIG. 15 shows the multi-segment tool 110 after a composite part 216 and a vacuum barrier 220 has been applied thereto. The composite part can be integrally formed in 360° or in portions thereof. As stated above, the composite may be laid upon the tool 110 by known methods, including for example laying together individual plies of pre-impregnated composite to create the final laminated structure. The composite part 216 can be a complex shape due to the geometries of the multi-segment tool 110. The composite can be comprised of a reinforcement and a matrix, such as described with the first embodiment above. The segment of the top portion 132 that extends above the fairings 126 serves as an upper sealing surface 137 for the vacuum barrier 220. The outer surface of the base 139 serves as a lower sealing surface 133 for the vacuum barrier 220. The vacuum barrier 220 extends over composite 216 and first, second and third tools (not shown in FIG. 15). Vacuum barrier 220 is secured to upper sealing surface 137 and lower sealing surface 133 using securing methods known to those in the art. In a preferred embodiment, the vacuum barrier 220 is sealed by a breather cloth and bagging putty (not shown), as is known in the art. Further processing can occur to cure the composite part 216 in the similar manner as discussed in relation to the first embodiment above.

Figure 16:
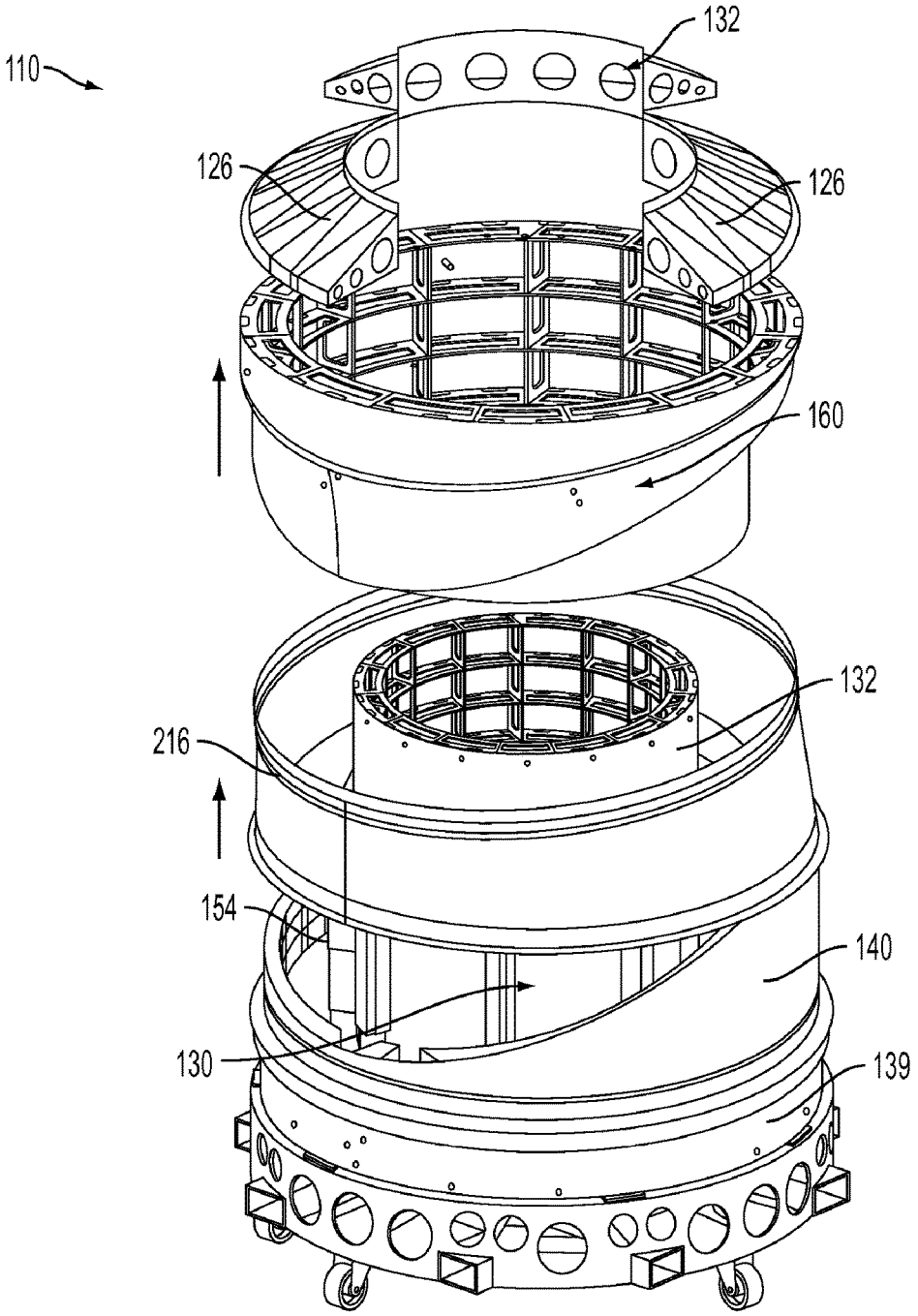
FIG. 16 shows a perspective assembly schematic of a multi-segment tool and composite.

FIG. 16 is a schematic view, illustrating how the components of the multi-segment tool 110 and composite 216 are disassembled following curing. Initially vacuum barrier 220 (not shown in FIG. 16), two portions 132 and fairings 126 can be removed from multi-segment tool 110. Thereafter, third tool 160 can be axially removed from multi-segment tool 110. Axial removal of third tool 160 initially leaves composite part 216 around second tool 140. Composite part 216 can then be removed from first and second tools 130 and 140. Subsequent steps can include removal of the second tool 140 for storage and/or cleaning. Following disassembly, first 130, second 140, third 160 tools, and fairings 126 can be used to reconstruct multi-segment tool 110 for subsequent composite part formation.

This invention permits more than one removable piece of tooling to be used in conjunction with other tools, without the requirement of vacuum sealing surfaces between the tools. A vacuum barrier can be sealed to a single structure, and capture any intermediate tools along with the preform or composite. This eliminates the need to have sealing surfaces between removable tools, thereby minimizing leak exposure and the number of resulting seams. This method is advantageous for 360 degree tooling applications, but also can be used in other non-360 degree applications. Since intervening pressure seals are not required, the interfaces between upper and lower parts can be made with greater mechanical tolerances.

In addition, the use of minimal components ensure proper alignment as described above, which often is a problem with multi-segmented bond tooling. The use of indexes helps ensure accurate mating or clocking of tool sections and profiles.

Embodiments of this invention provide many advantages over prior art methods. Since the vacuum barrier is attached to portions (e.g., top and bottom as shown in embodiments) of a first tool that is itself vacuum-tight, the lower profile (e.g., element 145) and upper profile (e.g., element 165) of the embodiments that receive the preform need not be vacuum-tight. Hence the lower profile and upper profile (when combined, sometimes called in the art a "facesheet") can accommodate tool holes, through bushings, and other discontinuities that often are needed for mechanical assembly, tool replacement and cleaning. Hence, the facesheet can have greater tolerances for machined parts, and broader standards for welding around holes and projections that otherwise would increase tool manufacturing complexity. Such tolerances, through holes and other often minor incongruities in the facesheet have limited negative impact on vacuum integrity. This advantage simplifies overall tool construction and allows for more efficient tool turnaround and cleaning following use.

The above descriptions of various embodiments of the invention are intended to describe and illustrate various elements and aspects of the invention. Persons of ordinary skill in the art will recognize that certain changes and modifications can be made to the described embodiments without departing from the scope of the invention. All such changes and modifications are intended to be within the scope of the appended claims.

We claim:

1. A method of forming a composite part comprising the steps of:

providing a first tool;

providing a second tool having a top, a bottom and an opening connecting the top and bottom;

lowering the second tool onto the first tool such that the first tool protrudes [through] *into* the opening and a top edge of the first tool extends above the top of the second tool;

[applying a composite preform on at least a portion of the second tool;]

applying a composite preform directly on at least a portion of the first tool, in addition to on at least a portion of the second tool;

vacuum sealing the composite preform by securing a vacuum barrier to the first tool, while the preform and second tool are encapsulated within the vacuum barrier; and curing the preform to form a composite part.

2. The method of forming a composite part of claim 1, further comprising the steps of:

removing the vacuum barrier from the first tool;

removing the second tool; and removing the cured composite part from the first tool.

3. The method of forming a composite part of claim 1, further comprising the steps of:

aligning the first tool and second tool to minimize seams in the resulting composite part.

4. The method of forming a composite part of claim 3, where the first tool and second tool are aligned by using alignment guides.

5. The method of forming a composite part of claim 1, further comprising:

providing a third tool, that mates with the second tool to form a profile for receiving the preform.

6. The method of forming a composite part of claim 1 where the second tool is axially removed from the first tool.

7. The method of forming a composite part of claim 1 where the composite part is an integrally formed 360 degree part having an annular opening therein.

8. The method of forming a composite part of claim 5 where the first tool comprises a base and a core, and the second tool and the third tool are positioned at least partially on the core; and the composite part is formed on the second and third tool.

9. The method of forming a composite part of claim 8 where the core of the first tool has a ridge that at least partially receives the second tool.

10. The method of forming a composite part of claim 4 where the guides at least partially align both the second tool and a third tool.

11. The method of forming a composite part of claim 1, comprising securing the vacuum barrier to a top portion of the first tool and also to a bottom portion of the first tool, wherein the second tool is located between the top portion of the first tool and the bottom portion of the first tool.

12. The method of forming a composite part of claim 1, comprising securing the vacuum barrier to a top portion of the first tool and also to a base supporting the first tool, wherein the second tool is located between the top portion of the first tool and the base supporting the first tool.

13. A method of forming a composite part comprising the steps of:

providing a first tool having a top portion provided with a top edge and a bottom portion [provided with a bottom edge];

providing a second tool having a top, a bottom and an opening connecting the top and bottom;

lowering the second tool onto the first tool such that the first tool protrudes through the opening with the top edge of the first tool extending above the top of the second tool [and the bottom edge of the first tool extending below the bottom of the second tool];

providing a third tool, that mates with the second tool to form a profile for receiving [perform] *a preform*;

applying a composite preform on at least a portion of the second tool and also on at least a portion of the first tool;

securing a vacuum barrier to at least one of the top portion and the bottom portion of the first tool such that the preform and second tool are encapsulated within the vacuum barrier; and curing the preform to form a composite part.

14. The method of forming a composite part of claim 13, further comprising the steps of:

removing the third tool after the preform is cured to form the composite part;

then removing the composite part from the first and second tool.

15. The method of forming a composite part of claim 13, comprising securing the vacuum barrier to both the top portion and the bottom portion of the first tool.

16. The method of forming a composite part of claim 13, comprising securing the vacuum barrier to the top portion of the first tool and also to a base supporting the first tool.

[17. The method of forming a composite part of claim 13, comprising securing the vacuum barrier to both the top portion and the bottom portion of the first tool.]

[18. The method of forming a composite part of claim 13, comprising securing the vacuum barrier to the top portion of the first tool and also to a base supporting the first tool.]

19. A method of forming a composite part comprising the steps of:

providing a first tool;

providing a second tool having a top, a bottom and an opening connecting the top and bottom;

positioning the first tool and second tool relative to each other such that the first tool protrudes [through] *into* the opening and a top edge of the first tool extends above the top of the second tool;

[applying a composite preform on at least a portion of the second tool;]

applying a composite preform directly on at least a portion of the first tool, in addition to on at least a portion of the second tool;

vacuum sealing the composite preform by securing a vacuum barrier to the first tool, while the preform and second tool are encapsulated within the vacuum barrier; and curing the preform to form a composite part.

* * * * *